(12) United States Patent
Bernardini et al.

(10) Patent No.: US 11,338,690 B2
(45) Date of Patent: May 24, 2022

(54) POWER-SUPPLY AND RECHARGE GROUPS

(71) Applicant: IVECO S.p.A., Turin (IT)

(72) Inventors: Alessandro Bernardini, Genoa (IT); Cristian Bertolotto, Levanto (IT); Giorgio Mantovani, Genoa (IT)

(73) Assignee: IVECO S.p.A., Turin (IT)

( * ) Notice: Subject to any disclaimer, the term of this patent is extended or adjusted under 35 U.S.C. 154(b) by 33 days.

(21) Appl. No.: 17/062,181

(22) Filed: Oct. 2, 2020

(65) Prior Publication Data
US 2021/0138920 A1 May 13, 2021

(30) Foreign Application Priority Data

Oct. 4, 2019 (IT) .......................... 102019000018011

(51) Int. Cl.
*B60L 53/22* (2019.01)
*B60L 53/62* (2019.01)
*H02J 7/00* (2006.01)
*B60L 53/10* (2019.01)

(52) U.S. Cl.
CPC .............. *B60L 53/22* (2019.02); *B60L 53/62* (2019.02); *H02J 7/0024* (2013.01); *B60L 53/11* (2019.02)

(58) Field of Classification Search
CPC .......... B60L 53/22; B60L 53/62; B60L 53/11; B60L 2210/10; B60L 2240/547; B60L 50/66; B60L 53/14; B60L 58/12; B60L 58/18; B60L 58/22; B60L 1/20; H02J 7/0024; H02J 2310/48; H02J 7/0014; H02J 7/342; Y02T 10/7072; Y02T 10/70; Y02T 10/72; Y02T 90/12; Y02T 90/14

USPC ......................................................... 320/109
See application file for complete search history.

(56) References Cited

U.S. PATENT DOCUMENTS

| | | | |
|---|---|---|---|
| 2013/0307489 A1 | 11/2013 | Kusch et al. | |
| 2014/0217973 A1* | 8/2014 | Lee ......................... | B60L 53/22 320/109 |
| 2015/0061569 A1* | 3/2015 | Alexander .............. | B60L 53/22 320/109 |
| 2015/0183328 A1* | 7/2015 | Kusch ..................... | B60L 58/12 320/109 |
| 2019/0160961 A1 | 5/2019 | Shen et al. | |

FOREIGN PATENT DOCUMENTS

| | | |
|---|---|---|
| DE | 10 2012 220870 | 5/2013 |
| DE | 10 2014 004790 | 10/2015 |
| DE | 10 2016 207272 | 11/2017 |

* cited by examiner

*Primary Examiner* — Paul Dinh
(74) *Attorney, Agent, or Firm* — Leason Ellis LLP

(57) ABSTRACT

A power-supply and recharge group for an electric vehicle comprising: a first battery pack; a second battery pack; a first DC-to-DC converter; a second DC-to-DC converter; a low-voltage power-supply source; and a control unit configured to: detect a charge difference between a first and a second battery pack; transfer an electric current from a low-voltage power-supply source to the one of the first and second battery pack having a lower charge, until said charge difference is cancelled; connect the first and the second battery pack to one another in series and recharge them by means of a recharge station on the outside of the vehicle. A direct connection between the DC-to-DC converters can replace the auxiliary low-voltage source.

15 Claims, 3 Drawing Sheets

POWER-SUPPLY AND RECHARGE GROUPS

CROSS-REFERENCE TO RELATED APPLICATIONS

This patent application claims priority from Italian patent application no. 102019000018011 filed on Oct. 4, 2019, the entire disclosure of which is incorporated herein by reference.

TECHNICAL FIELD

The invention relates to power-supply and recharge groups for an electric vehicle and to relative methods.

KNOWN STATE OF THE ART

As it is known, in a pure electric vehicle (EV), an electric motor is the only source of mechanical energy used to drive the vehicle; in a hybrid electric vehicle, the electric motor is a further source of mechanical energy, in addition to the one provided by a traditional engine (for example a combustion engine) or by an engine of another type.

In both cases, the electrical energy powering the electric motor is typically stored in one or more electrochemical storage devices or batteries. When the energy stored in the batteries decreases, they can be charged by connecting the vehicle to an external power-supply source. Recharge stations (also known as "Electric Vehicle Supply Equipment"—EVSE), which are used to this purpose, act as interfaces between the vehicle and a power supply network, in order to supply the batteries with a charge or recharge current. Known recharge stations are configured to deliver recharge powers whose maximum value depends on the voltage and current supported both by the recharge stations themselves and by the electrical components used to provide the service (cables, contacts, etc.). More in particular, the maximum deliverable voltage depends on the features, performances and/or building specifications of the recharge station taken into account and on the maximum voltage supported by the batteries of the electric vehicle being charged.

Currently, recharge stations are available, which are enabled to provide voltages up to 1000 V (high-power recharge stations—HPC EVSE) and ensure small charging times. However, in order to fully exploit the voltage provided by these stations, the batteries mounted on board the vehicle must be designed to support voltages with a corresponding value. Batteries and electronic components capable of supporting recharge voltages up to 800 V are available in the market, but are very expensive and, therefore, are not widely spread.

Therefore, there is a strong need to make use of high-power recharge stations, in particular capable of delivering energy at 800 V, though using, at the same time, batteries and electronic components that are available in the market and are not too expensive.

The object of the invention is to fulfil the needs discussed above.

SUMMARY OF THE INVENTION

The aforesaid object is reached by power-supply and recharge groups of an electric vehicle and by relative methods according to the appended claims.

BRIEF DESCRIPTION OF THE DRAWINGS

The invention will be best understood upon perusal of the following detailed description of a preferred embodiment, which is provided by way of non-limiting example, with reference to the accompanying drawings, wherein.

DETAILED DESCRIPTION OF THE INVENTION

Figure 1:
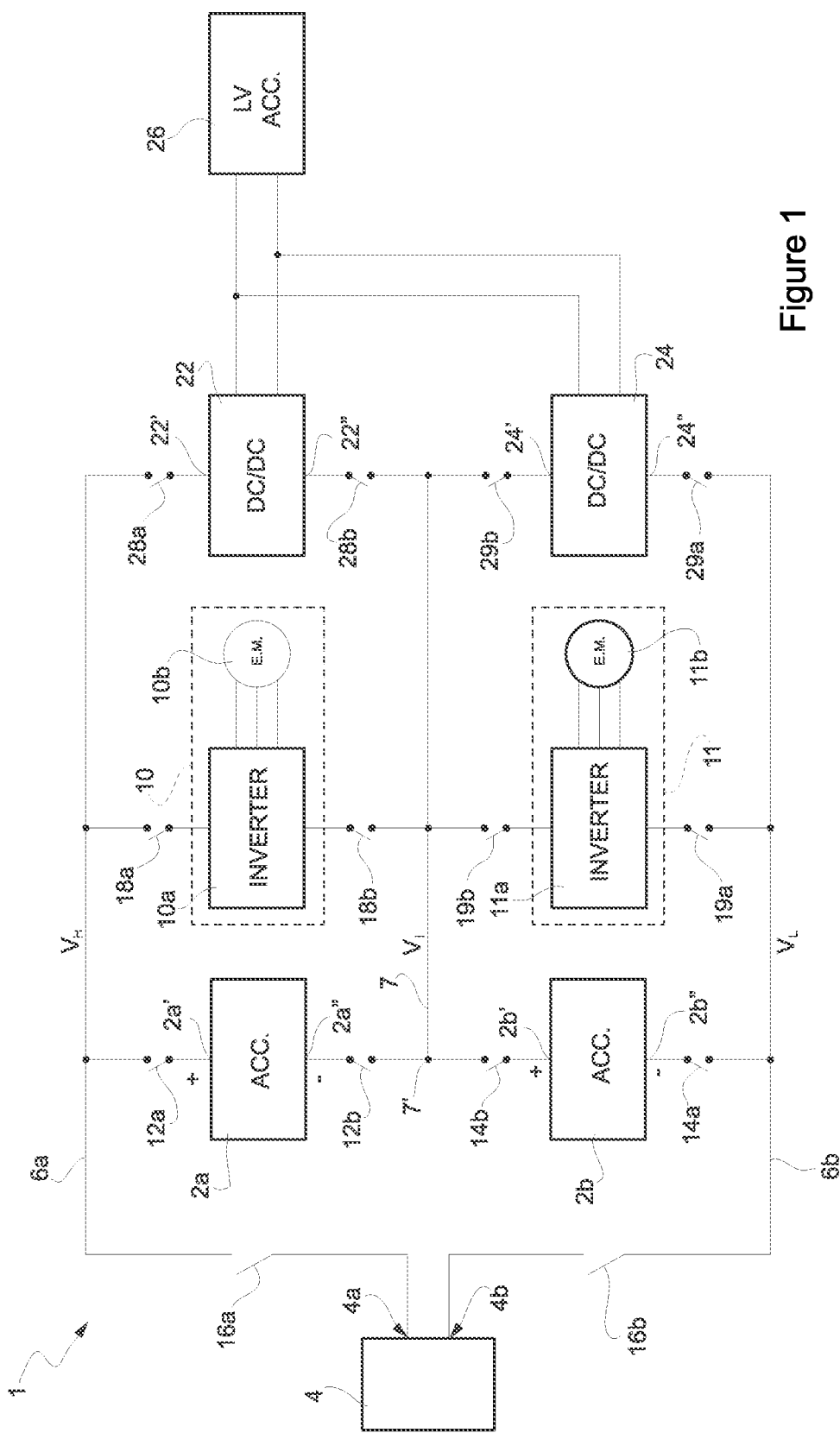
FIG. 1 shows a power-supply and recharge circuit of an electric vehicle according to an embodiment of the invention.

FIG. 1 schematically shows a power-supply and recharge circuit 1 of an electric vehicle (schematically shown in FIG. 3) to recharge a plurality of battery packs 2a-2b of the electric vehicle and power, through said battery packs 2a-2b, a respective plurality of electrical loads 10-11 of the electric vehicle.

In this context, the term "electric vehicle" identifies both a pure and a hybrid electric vehicle.

In the embodiment shown in FIG. 1, the aforesaid plurality consists of two and, therefore, there are a first battery pack 2a and a second battery pack 2b, which are operatively connected to a first electrical load 10 and to a second electrical load 11 respectively. However, the invention can also be implemented with a different number of battery packs (greater than two, for example four) and of respective electrical loads powered by each one of them.

The first electrical load 10 is electrically connected to the power-supply line 6a and to the power-supply line 7 by means of respective switches 18a and 18b, which can be switched to an open state (to disconnect the electrical load 10 from the lines 6a, 7) and, alternatively, to a closed state (to connect the electrical load 10 to the lines 6a, 7).

The second electrical load 11 is electrically connected to the power-supply line 6b and to the power-supply line 7 by means of respective switches 19a and 19b, which can be switched to an open state (to disconnect the electrical load 11 from the lines 6b, 7) and, alternatively, to a closed state (to connect the electrical load 11 to the lines 6b, 7).

The first battery pack 2a is operatively connected to the first electrical load 10 in order to provide the electrical energy needed for the operation thereof. The second battery pack 2b is operatively connected to the second electrical load 11 in order to provide the electrical energy needed for the operation thereof.

The first and the second battery packs 2a-2b each include one or more rechargeable power storage batteries, for example lithium-ion batteries or, in general, known electrochemical batteries.

The first and the second battery packs 2a, 2b each have the same nominal recharge voltage, for example amounting, herein, to 400V.

The first battery pack 2a has a positive terminal 2a' (+ pole) and a negative terminal 2a" (− pole). Similarly, the second battery pack 2b also has a positive pole 2b' (+ pole) and a negative terminal 2b" (− pole).

A connector 4 (which is also known as "charging inlet") is fixed to the electric vehicle in a known manner and is provided with a first and a second power-supply pins 4a and 4b, which are operatively connected to a power-supply bus 6 The power-supply bus 6 comprises a power-supply line 6a and a power-supply line 6b, which are used to power the first and the second battery packs 2a, 2b during a recharge of the electric vehicle and to power the electrical loads 10, 11 during a use (for example drive) of the electric vehicle.

The first power-supply pin 4a of the connector 4 is coupled, through a switch 16a, to the power-supply line 6a. The second power-supply pin 4b is connected, through a switch 16b, to the power-supply line 6b. The switches 16a and 16b can be switched to an open state and to a closed state so as to electrically disconnect and connect, respectively, the power-supply pins 4a, 4b from/to the lines 6a and 6b, respectively.

In particular, during the recharge of the first and the second battery packs 2a, 2b, the switches 16a and 16b are closed and the power-supply line 6s is polarized at a first power-supply voltage $V_H$ (e.g. $V_H$=800V), whereas the power-supply line 6b is polarized at a second voltage $V_L$ (e.g. $V_L$=0V). In a different embodiment, the first voltage $V_H$ is +400V and the second voltage $V_L$ is −400V. In general, between the power-supply line 6a and the power-supply line 6b there is a difference of potential that is equal to the sum of the nominal recharge voltages of the battery packs 2a, 2b (here, 800 V).

Furthermore, there is a further power-supply line 7. During the aforesaid recharge, the power-supply line 7 is polarized at a third voltage $V_I$ with an intermediate value between the first and the second voltage $V_H$, $V_L$; in particular, said intermediate value is defined by the nominal voltage of the first and the second battery packs 2a, 2b and is such that the difference of potential between the first voltage $V_H$ (second voltage $V_L$) and the third voltage $V_I$ is equal to the nominal voltage of the first (second) battery pack 2a (2b). For instance, if $V_H$=800V and $V_L$=0V, then $V_I$=400V; if $V_H$=400V and $V_L$=−400V, then $V_I$=0V.

The electrical load 10 includes, in a known manner which is not part of the subject-matter of the invention, at least one inverter 10a, which is connected to an electric motor 10b so as to generate a torque to move the electric vehicle. Similarly, the electrical load 11 includes, in a known manner which is not part of the subject-matter of the invention, at least one inverter 11a, which is coupled to an electric motor 11b so as to generate a torque to move the electric vehicle. For example, the electric motor 10a is a front motor of the electric vehicle (e.g. coupled to the front axle of the vehicle), whereas the electric motor 10b is a rear motor of the electric vehicle (e.g. coupled to the rear axle of the vehicle).

The electrical loads 10 and 11 can also include further components or systems of the electric vehicle, which use, for their operation, the current flowing in the power-supply bus 6 (for example, the air conditioning system, the lighting system, the infotainment system, etc.)

A switch 12a is interposed between the positive terminal 2a' (+ pole) and the line 6a. When the switch 12a is in an open state, the positive terminal 2a' is electrically disconnected from the line 6a; when the switch 12a is in a closed state, the positive terminal 2a' is electrically connected to the line 6a.

A switch 12b is interposed between the negative terminal 2a" (− pole) and line 7 (at the node 7'). When the switch 12b is in an open state, the negative terminal 2a" is electrically disconnected from the 7; when the switch 12b is in a closed state, the negative terminal 2a" is electrically connected to the line 7.

Similarly, the second battery pack 2b has its own positive terminal 2b' (+ pole) connected to the line 7 through a switch 14b and its own negative terminal 2b" (− pole) connected to the line 6b through a switch 14a so as to connect and disconnect, depending on the closed or open state of the switches 14a, 14b, the battery pack 2b to/from the lines 7 and 6b.

According to the figure, the terminal 2b' of the second battery pack 2b is connected to the node 7'. Hence, the first and the second battery packs 2a, 2b are connected to one another in series between the line 6a and the line 6b.

Since the battery packs 2a, 2b are electrically connected to one another in series, the maximum voltage supported by the said series during the recharge through the connector 4 is greater than each one of the nominal voltages of the battery packs 2a, 2b; in particular, the maximum voltage supported by series of the battery packs 2a, 2b is the result of the sum of the nominal recharge voltages of the battery packs 2a, 2b (hence, in this example, the maximum voltage supported by the battery pack 2 is 800V). Therefore, it is possible to fully exploit the potentialities (e.g. power delivered) of the recharge station, recharging both battery packs 2a, 2b at a voltage that is greater than the one that could be used if the battery packs 2a, 2b had to be recharged singularly.

The electrical load 10 is operatively connected to the power-supply lines 6a and 7 in such a way that, during a supply of power to the electrical load 10 through the first battery pack 2a, the electrical load 10 can receive the necessary power. In particular, the electrical load 10 is in parallel to the first battery pack 2a.

Similarly, the electrical load 11 is operatively connected to the power-supply lines 6a and 7 in such a way that, during a supply of power to the electrical load 11 through the second battery pack 2b, the electrical load 11 can receive the necessary power. In particular, the electrical load 11 is in parallel to the second battery pack 2b.

The Applicant found out that, during the use of the electric vehicle, when the first and the second battery packs 2a, 2b power the respective loads 10, 11, the first and the second battery packs 2a, 2b can discharge in a non-uniform manner, depending on the energy requested by the respective loads 10, 11, which cannot be the same. In this case, during the recharge of the battery packs 2a, 2b, the battery pack 2a, 2b that reaches the complete charge first inhibits the completion of the recharge of the other battery pack 2a, 2b. This situation, if it is not properly handled, jeopardizes the correct operation of the electric vehicle.

In order to solve this problem, according to an aspect of the invention, the power-supply and recharge circuit 1 further comprises a first and a second DC-to-DC converters 22, 24. In particular, the DC-to-DC converters 22, 24 are bidirectional converters and are electrically connected in parallel to the first battery pack 2a and to the second battery pack 2b respectively.

More in detail, the first converter 22 has a first terminal 22', which is electrically connected to the power-supply line 6a, and a second terminal 22", which is electrically connected to the power-supply line 7; the second converter 24 has a first terminal 24', which is electrically connected to the power-supply line 7, and a second terminal 24", which is electrically connected to the power-supply line 6b.

Furthermore, the first and the second converters 22, 24 are operatively connected to an auxiliary battery 26, for example the low-voltage battery of the electric vehicle or a properly suited battery or storage device. The auxiliary battery 26 has a nominal voltage, for example of 12 V, or another typically, though not exclusively LV voltage (class A).

In case the condition mentioned above occurs, so that the first and the second battery packs 2a, 2b have a different residual charge (for example by a percentage exceeding a predefined threshold, which is chosen at will), the one between the converter 22 and the converter 24 that is operatively connected to the battery pack 2a or 2b having the lower charge is controlled so as to carry out a transfer of electric charge from the auxiliary battery 26 towards the respective battery pack 2a or 2b. Vice versa, the one between the converter 22 and the converter 24 that is operatively connected to the battery pack 2a, 2b having the higher charge is controlled so as to carry out a transfer of electric charge from the respective battery pack 2a or 2b towards the auxiliary battery 26.

By way of example, we assume that the first battery pack 2a has a residual charge that is lower than the charge of the second battery pack 2b. In this case, the residual charges of the battery packs 2a, 2b need to be balanced.

The DC-to-DC converter 22 is controlled as a voltage increasing converter (for example "boost converter") so as to supply power from the auxiliary battery 26 to the first battery pack 2a, until the desired charge of the first battery pack 2a (namely, a charge that is the same as the charge of the second battery pack 2b) is reached. The second DC-to-DC converter 24, on the other hand, is controlled so as to operate as a voltage reducing converter (for example "buck converter") in order to supply power from the second battery pack 2b to the auxiliary battery 26. In general, the second converter 24 is controlled so as to operate as a voltage reducing converter, thus transferring electric charge from the second battery pack 2b to the auxiliary battery 26, any time it is suitable or necessary to restore the correct charge of the auxiliary battery 26 during the recharge of the second battery pack 2b.

Similarly, if the first battery pack 2a has a residual charge that is higher than the charge of the second battery pack 2b, before recharging both battery packs 2a, 2b by means of the external recharge station, the residual charges of the battery packs 2a, 2b need to be balanced. Therefore, in this case, the DC-to-DC converter 24 is controlled as a voltage increasing converter in order to supply power from the auxiliary battery 26 to the second battery pack 2b, until the desired charge of the second battery pack 2b (namely, a charge that is the same as the charge of the first battery pack 2a) is reached; and the first DC-to-DC converter 22 is controlled so as to operate as a voltage reducing converter in order to supply power from the first battery pack 2a to the auxiliary battery 26.

The balancing of the residual charge of the first and of the second battery packs 2a, 2b and the restoring of the charge of the auxiliary battery 26 are carried out in different or coinciding time intervals.

The DC-to-DC converters 22, 24 are controlled, in their operation, by an electronic control unit 51 (shown in FIG. 3 with the relative reference number) of the vehicle 50 or by a control unit dedicated to this task, in a known manner, so as to operate the voltage increase or the voltage reduction according to the operating conditions described above.

In general, the DC-to-DC converters 22, 24 carry out and energy adjustment in order to transfer energy from the auxiliary battery 26 to the battery packs 2a and 2b, respectively, transfer energy from the battery packs 2a, 2b to the auxiliary battery 26 and transfer energy between the battery packs 2a, 2b.

The DC-to-DC converters 22, 24 can optionally operate during the supply of power from the auxiliary battery 26 to the first and/or second electrical loads 10, 11 so as to transfer energy from the auxiliary battery 26 to the first and/or second electrical loads 10, 11.

The detection of the residual charge of the first and of the second battery packs 2a, 2b takes place in a known manner.

Indeed, suitable electronic control units (BMS) are available in the state of the art and are present on board currently marketed electric vehicles, so that they can be connected to the batteries and detect as well as make available the information concerning the residual charge of the batteries. The batteries normally available in the market incorporate these electronic control units (BMS) and make the state of charge (SOC) available to the outside so that it can easily be acquired by the electronic control unit 51.

Figure 2:
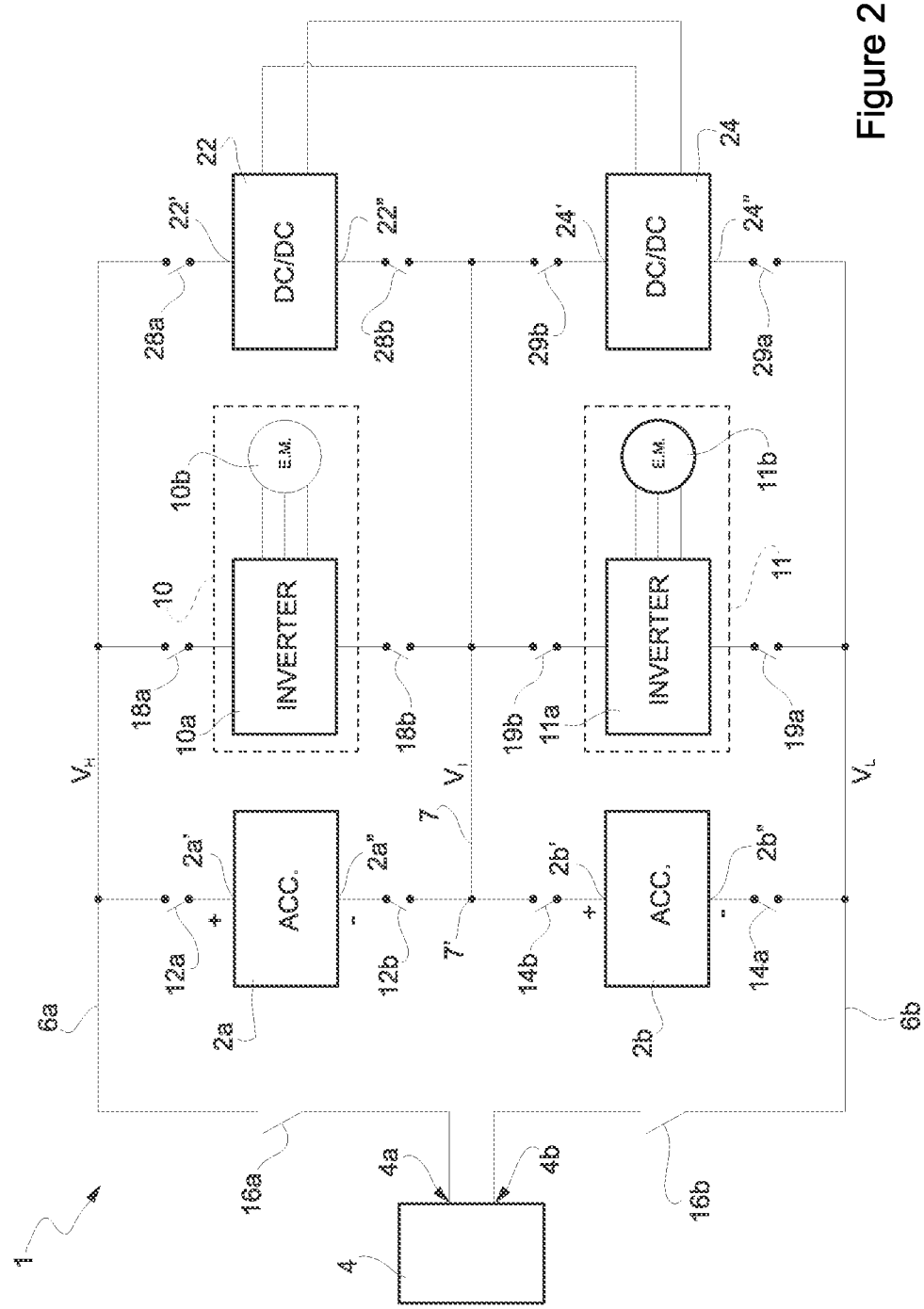
FIG. 2 shows a power-supply and recharge circuit of an electric vehicle according to a further embodiment of the invention.

According to an alternative embodiment, which is shown in FIG. 2, the auxiliary battery 26 is absent and the balancing between the first and the second battery packs 2a, 2b is carried out by directly transferring electric charge between the first and the second battery packs 2a, 2b. Those elements shared by the circuit of FIG. 2 and the circuit of FIG. 1 are shown with the same reference numbers and are not described any further.

Now, we assume that the first battery pack 2a has a residual charge that is lower than the charge of the second battery pack 2b. In this case, before recharging both battery packs 2a, 2b by means of the external recharge station, the residual charges of the battery packs 2a, 2b need to be balanced.

Therefore, the DC-to-DC converter 22 is controlled as a voltage increasing converter (for example "boost converter") so as to supply power from the DC-to-DC converter 24 to the first battery pack 2a, until the desired charge of the first battery pack 2a (namely, a charge that is the same as the charge of the second battery pack 2b) is reached, up to the desired value, then the recharge of the first battery pack 2a is interrupted and the second converter 24 is controlled so as to operate as a voltage reducing converter (for example "buck converter") in order to supply power from the second battery pack 2b to the DC-to-DC converter 22. In general, the second converter 24 is controlled so as to operate as a voltage reducing converter, thus transferring electric charge from the second battery pack 2b to the battery 2a through the converter 22. Similarly, if the first battery pack 2a has a residual charge that is higher than the charge of the second battery pack 2b, before recharging both battery packs 2a, 2b by means of the external recharge station, the residual charges of the battery packs 2a, 2b need to be balanced, reversing the flows described above.

Hereinafter, the description will make reference to both the embodiments of FIGS. 1 and 2, unless explicitly indicated otherwise.

The switches 12a, 12b, 14a, 14b, 16a, 16b, 18a, 18b, 19a, 19b, 28a, 28b, 29a, 29b are operatively connected to the electronic control unit 51, which is configured to switch the switches 12a, 12b, 14a, 14b, 16a, 16b, 18a, 18b, 19a, 19b, 28a, 28b, 29a, 29b to an open and closed state in order to implement the operating modes described above and explained below in a schematic manner by means of truth tables.

In detail, the electronic control unit 51 is configured to control the switches 12a, 12b, 14a, 14b, 16a, 16b, 18a, 18b, 19a, 19b, 28a, 28b, 29a, 29b so as to implement a plurality of operating modes of the power-supply and recharge circuit 1, among which there are, in particular: a rest mode (or "key-off" mode), a power-supply mode to power the electrical loads 10, 11, a recharge mode to recharge the battery packs 2a, 2b and a charge balancing mode to balance the charge of the battery packs 2a, 2b.

In the key-off mode, the electric vehicle (namely, the electrical loads 10, 11) is not powered by means of the battery packs 2a, 2b and, at the same time, the battery packs 2a, 2b are not being charged (for example, when the electric vehicle is parked).

In the power-supply mode, the first and the second electrical loads 10, 11 are powered by means of the respective battery pack 2a, 2b (for example, during the drive). In some operating conditions, only one of the two electrical loads 10, 11 could need to be powered by means of the respective battery pack 2a, 2b.

In the recharge mode, the battery packs 2a, 2b are recharged using the 800 V recharge voltage provided, if available, by the recharge station.

The electronic control unit 51 can be the electronic control unit of the electric vehicle, properly configured, via software, to implement the aforesaid operating modes; alternatively, the electronic control unit 51 can be a further control unit in addition to the electronic control unit of the electric vehicle or a generic controller, properly configured and designed to implement the aforesaid operating modes.

More in detail, in the key-off mode, the switches 12a, 12b, 14a, 14b, 16a, 16b, 18a, 18b, 19a, 19b, 28a, 28b, 29a, 29b are controlled by the electronic control unit 51 so as to switch to an open state.

The following table schematically shows the state of the aforesaid switches in the key-off mode:

| Switch 12a | OPEN |
|---|---|
| Switch 12b | OPEN |
| Switch 14a | OPEN |
| Switch 14b | OPEN |
| Switch 16a | OPEN |
| Switch 16b | OPEN |
| Switch 18a | OPEN |
| Switch 18b | OPEN |
| Switch 19a | OPEN |
| Switch 19b | OPEN |
| Switch 28a | OPEN |
| Switch 28b | OPEN |
| Switch 29a | OPEN |
| Switch 29b | OPEN |

Therefore, the batteries 2a and 2b are electrically disconnected both from the charging inlet 4 and from the power bus 6.

In the power-supply mode to power the electrical loads 10, 11, the switches 16a and 16b are controlled by the electronic control unit 51 so as to switch to an open state, whereas the switches 12a, 12b, 14a, 14b, 18a, 18b, 19a, 19b are controlled by the electronic control unit 51 so as to switch to a closed state.

The switches 28a, 28b, 29a, 29b can indifferently be open or closed, depending on vehicle logics that are not linked to the invention and, therefore, will not be discussed any further.

The following table schematically shows the state of the aforesaid switches in the power-supply mode:

| Switch 12a | CLOSED |
|---|---|
| Switch 12b | CLOSED |
| Switch 14a | CLOSED |
| Switch 14b | CLOSED |
| Switch 16a | OPEN |
| Switch 16b | OPEN |
| Switch 18a | CLOSED |
| Switch 18b | CLOSED |
| Switch 19a | CLOSED |
| Switch 19b | CLOSED |
| Switch 28a | OPEN/CLOSED |
| Switch 28b | OPEN/CLOSED |
| Switch 29a | OPEN/CLOSED |
| Switch 29b | OPEN/CLOSED |

Consequently, the battery packs 2a, 2b are electrically connected in parallel to the electrical loads 10, 11 by means of the power-supply bus 6 and the power-supply line 7, so that the electrical loads 10, 11 are powered by means of the voltage provided by the respective battery packs 2a, 2b. As already mentioned above, in this embodiment, each battery pack 2a, 2b provides the respective electrical load 10, 11 with a nominal voltage of approximately 400 V. Furthermore, the battery packs 2a, 2b are electrically disconnected from the connector 4.

In the recharge mode, the switches 16a, 16b, 12a, 12b, 14a and 14b are controlled by the electronic control unit 51 so as to switch to a closed state, whereas the switches 18a, 18b, 19a, 19b are controlled by the electronic control unit 51 so as to switch to an open state. The switches 28a, 28b, 29a, 29b can indifferently be open or closed, depending on vehicle logics that are not linked to the invention and, therefore, will not be discussed any further.

The following table schematically shows the state of the aforesaid switches in the recharge mode:

| Switch 12a | CLOSED |
|---|---|
| Switch 12b | CLOSED |
| Switch 14a | CLOSED |
| Switch 14b | CLOSED |
| Switch 16a | CLOSED |
| Switch 16b | CLOSED |
| Switch 18a | OPEN |
| Switch 18b | OPEN |
| Switch 19a | OPEN |
| Switch 19b | OPEN |
| Switch 28a | OPEN/CLOSED |
| Switch 28b | OPEN/CLOSED |
| Switch 29a | OPEN/CLOSED |
| Switch 29b | OPEN/CLOSED |

As a consequence, the battery packs 2a, 2b are electrically connected to one another in series between the power-supply lines 6a and 6b and are recharged by means of the power-supply voltage provided by the recharge station by means of the connector 4. In a known manner, during the recharge mode, the electric vehicle communicates to the recharge station the maximum voltage limit supported by series of the battery packs 2a, 2b, so as to protect the battery packs 2a, 2b from overvoltages. In this way, even if the recharge station were able to provide voltages exceeding 800 V, the battery packs 2a, 2b would be recharged at the nominal recharge voltage of the series of the battery packs 2a, 2b without damages. Since the power-supply bus 6, in this phase, is electrically powered, the electrical loads 10, 11 can be selectively disconnected from the power-supply lines 6a, 6b and 7. More in detail, during the recharge mode, the electric vehicle communicates to the recharge station, through the battery management system—BMS, the maximum voltage supported by the series of the battery packs 2a, 2b. The BMS communicates with the recharge station through high-level communication (e.g. PLC or WiFi or another communication mode), according to the IEC61851 and ISO15118 standards. The BMS is also interfaced with the electronic control unit 51 and serves as communication interface between the latter and the recharge station.

As an alternative or in addition to the BMS, the control system of the vehicle (VMU) can carry out this interface function.

In the charge balancing mode, the switches 12a, 12b, 14a, 14b, 28a, 28b, 29a, 29b are controlled by the electronic control unit 51 so as to switch to a closed state.

The switches 16a, 16b, 18a, 18b, 19a, 19b can indifferently be open or closed, depending on vehicle logics that are not linked to the invention and, therefore, will not be discussed any further.

The following table schematically shows the state of the aforesaid switches in the charge balancing mode:

| | |
|---|---|
| Switch 12a | CLOSED |
| Switch 12b | CLOSED |
| Switch 14a | CLOSED |
| Switch 14b | CLOSED |
| Switch 16a | OPEN/CLOSED |
| Switch 16b | OPEN/CLOSED |
| Switch 18a | OPEN/CLOSED |
| Switch 18b | OPEN/CLOSED |
| Switch 19a | OPEN/CLOSED |
| Switch 19b | OPEN/CLOSED |
| Switch 28a | CLOSED |
| Switch 28b | CLOSED |
| Switch 29a | CLOSED |
| Switch 29b | CLOSED |

As a consequence, the battery packs 2a, 2b are electrically connected in parallel to the respective DC-to-DC converter 22, 24 and receive/deliver energy from/to the auxiliary battery 26 (or exchange it) according to what explained above.

Figure 3:
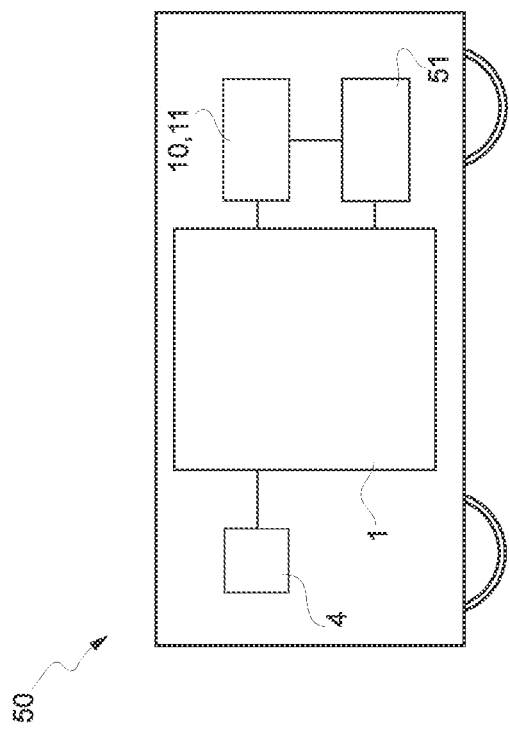
FIG. 3 schematically shows an electric vehicle provided with the circuit of FIG. 1.

FIG. 3 schematically shows an electric vehicle 50 including: the connector 4; the power-supply and recharge circuit 1; the electronic control unit 51; and the electrical loads 10, 11. The electronic control unit 51, as already mentioned above, is operatively connected to the switches 12a, 12b, 14a, 14b, 16a, 16b, 18a, 18b, 19a, 19b, 28a, 28b, 29a, 29b so as to implement the operating modes discussed above and, furthermore, is operatively connected to the electrical loads 2a, 2b, for example in order to inhibit the drive of the electric vehicle stopping the operation of the electric motor during the recharge mode; however, during the recharge mode, the electronic control unit 51 can be configured to enable the operation of the air conditioning system and/or of the lighting system or of other systems or components of the electric vehicle other than the motor.

Owing to the above, the advantages of the subject-matter of the invention are evident.

In particular, the invention allows for a reduction of the time needed to charge the battery pack of the electric vehicle, with the possibility of adjusting to the features and performances of different recharge stations with which the electric vehicle can be interfaced during the use, using low-cost components. In particular, it is possible to use batteries with a nominal charge voltage of a few or some hundreds of Volts (for example, up to 400V), which can easily be found in the market and are relatively cheap, and, at the same time, it is possible to fully exploit the power that can be delivered by high-power recharge stations (HPC EVSE), which are designed to supply power with voltages of at least 800V.

Furthermore, it is possible to use electronic components (inverters, DC-to-DC converters, . . . ) with a nominal voltage of a few or some hundreds of Volts (for example, up to 400V), which can easily be found in the market and are relatively cheap, and, at the same time, it is possible to fully exploit the power that can be delivered by high-power recharge stations (HPC EVSE), which are designed to supply power with voltages of at least 800V.

Finally, the subject-matter of the invention can be subjected to changes and variants, which, though, do not go beyond the scope of protection set forth in the appended claims.

In particular, the type of DC-to-DC converters that can be used in the context of the invention can be different from the one described above and, in particular, can be chosen in a suitable manner so as to fulfil specific needs of compatibility with the voltages present in the lines 6a, 6b and 7 and/or so as to fulfil specific needs of compatibility with the type of battery packs 2a, 2b used, in a known manner which is obvious for a person skilled in the art.

Furthermore, the functionalities of the switches 12a, 12b, 14a, 14b, 16a, 16b, 18a, 18b, 19a, 19b, 28a, 28b, 29a, 29b can be implemented by one single switch element or by a plurality of switch elements or by electric circuits properly designed for the purpose, for example in order to increase the electric insulation in the "open switch" state and/or their reliability or for other needs evident to a person skilled in the art.

In a non-limiting embodiment, one or more of (or all) the switches 12a, 12b, 14a, 14b, 16a, 16b, 18a, 18b, 19a, 19b, 28a, 28b, 29a, 29b are contactors, namely electric-mechanical devices, which are not manually operated and are designed to stand currents in high-power conditions (in this case, amounting to hundreds of Amperes, with voltages up to 800 V). Alternatively, the switches 12a, 12b, 14a, 14b, 16a, 16b, 18a, 18b, 19a, 19b, 28a, 28b, 29a, 29b can be solid-state devices, chosen according to the needs, or, in general, apparatuses capable of interrupting or establishing the current inside the circuit 1.

The invention claimed is:

1. A power-supply and recharge group (1) for an electric vehicle (50), comprising:
   a connector (4) connectable to a recharge station to receive a recharge voltage of the electric vehicle;
   a power-supply bus (6), including a first (6a) and a second (6b) power-supply line connected to the connector (4) by means of a first and a second switch (16a, 16b) respectively;
   a third power-supply line (7);
   a first battery pack (2a), having a nominal recharge voltage, electrically connected between the first power-supply line (6a) and the third power-supply line (7);
   a second battery pack (2b), having said nominal recharge voltage, electrically connected between the second power-supply line (6b) and the third power-supply line (7);
   a first bidirectional DC-to-DC converter (22) connected between the first power-supply line (6a) and the third power-supply line (7) by means of a first pair of connection terminals (22', 22''), and provided with a second pair of connection terminals;
   a second bidirectional DC-to-DC converter (24) electrically connected between the second power-supply line (6b) and the third power-supply line (7) by means of a third pair of connection terminals (24', 24''), and provided with a fourth pair of connection terminals,
   wherein the second and the fourth pairs of connection terminals are connected to an auxiliary power-supply source (26),
   the power-supply and recharge group (1) further comprising a control unit (51) operatively connected to the first and second switches (16a, 16b), to the first and second battery packs (2a, 2b) and to the first and second bidirectional DC-to-DC converters (22, 24) and configured to:

detect whether a charge difference between the first and the second battery packs (2a, 2b) is higher than a threshold;

open the first and the second switches (16a, 16b) to electrically isolate the power-supply bus (6) from the connector (4);

operate the first or the second bidirectional DC-to-DC converter (22, 24) to transfer an electric current from the auxiliary power-supply source (26) to one of the first and second battery packs (2a, 2b) having a lower charge, until said charge difference is within said threshold;

close the first and the second switches (16a, 16b) to electrically connect the power-supply bus (6) to the connector (4); and connect the first and the second battery packs (2a, 2b) to the power-supply bus (6) and electrically in series to each other, to recharge the first and the second battery packs (2a, 2b) with said recharge voltage.

2. The power-supply and recharge group according to claim 1, wherein the nominal recharge voltage of the first and of the second battery packs (2a, 2b) is 400V.

3. The power-supply and recharge group according to claim 1, wherein said connector (4) has a first and a second power-supply terminal (4a, 4b) connected to the first power-supply line (6a) and to the second power-supply line (6b) respectively, through said first and second switches (16a, 16b) respectively, said connector (4) being further configured to receive, from the recharge station, a recharge voltage having a value equal to 800V.

4. The power-supply and recharge group according to claim 1, wherein:

the first battery pack (2a) comprises a first pair of switches (12a, 12b) respectively connected to the first and third power-supply lines (6a, 7) to connect/disconnect the first battery pack (2a) to/from the first and third power-supply lines (6a, 7);

the second battery pack (2b) comprises a second pair of switches (14a, 14b) respectively connected to the second and third power-supply lines (6a, 7) to connect/disconnect the second battery pack (2b) to/from the second and third power-supply lines (6b, 7);

the first DC-to-DC converter (22) comprises a third pair of switches (28a, 28b) respectively connected to the first and third power-supply lines (6a, 7) to connect/disconnect the first DC-to-DC converter (22) to/from the first and third power-supply lines (6a, 7); and the second DC-to-DC converter (24) comprises a fourth pair of switches (29a, 29b) respectively connected to the second and third power-supply lines (6b, 7) to connect/disconnect the second battery pack (2b) to/from the second and third power-supply lines (6b, 7), wherein said control unit (51) is operatively connected to the first pair of switches (12a, 12b), to the second pair of switches (14a, 14b), to the third pair of switches (28a, 28b) and to the fourth pair of switches (29a, 29b), and is further configured to:

a) control the closing of the first (12a, 12b) or of the second (14a, 14b) pair of switches associated with the first or second battery pack (2a, 2b) having a lower charge, and control the closing of the third (28a, 28b) or of the fourth pair (29a, 29b) of switches associated with the first and the second DC-to-DC converters (22, 24), thus connecting the auxiliary power-supply source (26) to the first or second battery pack (2a, 2b) having a lower charge; and b) control the closing of the first (12a, 12b) and the second (14a, 14b) pairs of switches associated with the first and the second battery packs (2a, 2b), and control the closing of the third (28a, 28b) and the fourth pairs (29a, 29b) of switches associated with the first and the second DC-to-DC converters (22, 24) thus recharging the first and the second battery packs (2a, 2b) with said recharge voltage.

5. The power-supply and recharge group according to claim 1, wherein said nominal voltage of the auxiliary power-supply source is equal to 12V.

6. The power-supply and recharge group according to claim 4, wherein said control unit (51) is further configured to operate the first or the second bidirectional DC-to-DC converter (22, 24) to transfer an electric current from either the first or the second battery pack (2a, 2b) towards the auxiliary power-supply source (26).

7. A power-supply and recharge group for an electric vehicle (50), comprising:

a connector (4) connectable to a recharge station to receive a recharge voltage of the electric vehicle;

a power-supply bus (6), including a first (6a) and a second (6b) power-supply line, connected to the connector (4) by means of a first and a second switch (16a, 16b) respectively;

a third power-supply line (7);

a first battery pack (2a), having a nominal recharge voltage, electrically connected between the first power-supply line (6a) and the third power-supply line (7);

a second battery pack (2b), having said nominal recharge voltage, electrically connected between the second power-supply line (6b) and the third power-supply line (7);

a first bidirectional DC-to-DC converter (22) connected between the first power-supply line (6a) and the third power-supply line (7) by means of a pair of connection terminals (22', 22"), and provided with a second pair of connection terminals;

a second bidirectional DC-to-DC converter (24) electrically connected between the second power-supply line (6b) and the third power-supply line (7) by means of a third pair of connection terminals (24', 24"), and provided with a fourth pair of connection terminals, wherein the second and the fourth pairs of connection terminals are electrically connected to one another, wherein the power-supply and recharge group (1) further comprises a control unit (51), operatively connected to the first and second switches (16a, 16b), to the first and second battery packs (2a, 2b) and to the first and second bidirectional DC-to-DC converters (22, 24), and configured to carry out the steps of:

detecting whether a charge difference between the first and the second battery packs (2a, 2b) is higher than a threshold;

opening the first and the second switches (16a, 16b) to electrically isolate the power-supply bus (6) from the connector (4);

operating the first and the second bidirectional DC-to-DC converters (22, 24) to transfer an electric current from the first or second battery pack (2a, 2b) having the higher charge to the other between the first and the second battery packs (2a, 2b) having a lower charge, until said charge difference is within said threshold;

closing the first and the second switches (16a, 16b) to electrically connect the power-supply bus (6) to the connector (4); and coupling the first and the second battery packs (2a, 2b) to the power-supply bus (6) and electrically in series to each other, to recharge the first and the second battery packs (2a, 2b) with said recharge voltage.

8. An electric vehicle (50) powered by batteries, including a power-supply and recharge group (1) according to claim 1.

9. The electric vehicle (50) according to claim 8, further comprising a first and a second electric load (10, 11) electrically connected to the first battery pack (2a), and to the second battery pack (2b) respectively, to receive, in use, a respective power-supply voltage.

10. A power-supply and recharge method for an electric vehicle (50), the electric vehicle comprising:
a connector (4) connectable to a recharge station to receive a recharge voltage of the electric vehicle;
a power-supply bus (6), including a first (6a) and a second (6b) power-supply line, connected to the connector (4) by means of a first and a second switch (16a, 16b) respectively;
a third power-supply line (7);
a first battery pack (2a), having a nominal recharge voltage, electrically connected between the first power-supply line (6a) and the third power-supply line (7);
a second battery pack (2b), having said nominal recharge voltage, electrically connected between the second power-supply line (6b) and the third power-supply line (7);
a first bidirectional DC-to-DC converter (22) connected between the first power-supply line (6a) and the third power-supply line (7) by means of a first pair of connection terminals (22', 22"), and provided with a second pair of connection terminals;
a second bidirectional DC-to-DC converter (24) electrically connected between the second power-supply line (6b) and the third power-supply line (7) by means of a third pair of connection terminals (24', 24"), and provided with a fourth pair of connection terminals,
wherein the second and the fourth pairs of connection terminals are connected to an auxiliary power-supply source (26) having a nominal voltage lower than the nominal voltage of the first and of the second battery packs (2a, 2b),
the method comprising the steps of:
detecting whether a charge difference between the first and the second battery packs (2a, 2b) is higher than a threshold;
opening the first and the second switches (16a, 16b) to electrically isolate the power-supply bus (6) from the connector (4);
operating the first or the second bidirectional DC-to-DC converter (22, 24) in voltage elevation, to transfer an electric current from the auxiliary power-supply source (26) to one of the first and the second battery packs (2a, 2b) having a lower charge, until said charge difference is within said threshold;
closing the first and the second switches (16a, 16b) to electrically connect the power-supply bus (6) to the connector (4); and
coupling the first and the second battery packs (2a, 2b) to the power-supply bus (6) and electrically in series to each other, to recharge the first and the second battery packs (2a, 2b) with said recharge voltage.

11. The method according to claim 10, wherein the nominal recharge voltage of the first and the second battery packs (2a, 2b) is 400V.

12. The method according to claim 10, wherein said connector (4) has a first and a second power-supply terminal (4a, 4b) connected to the first power-supply line (6a) and to the second power-supply line (6b) respectively, through said first and second switches (16a, 16b) respectively,
further comprising the step of receiving, from the recharge station through the connector (4), a recharge voltage having a value equal to 800V.

13. The method according to claim 10, wherein:
the first battery pack (2a) comprises a first pair of switches (12a, 12b) respectively connected to the first and third power-supply lines (6a, 7) to connect/disconnect the first battery pack (2a) to/from the first and third power-supply lines (6a, 7);
the second battery pack (2b) comprises a second pair of switches (14a, 14b) respectively connected to the second and third power-supply lines (6b, 7) to connect/disconnect the second battery pack (2b) to/from the second and third power-supply lines (6b, 7);
the first DC-to-DC converter (22) comprises a third pair of switches (28a, 28b) respectively connected to the first and third power-supply lines (6a, 7) to connect/disconnect the first DC-to-DC converter (22) to/from the first and third power-supply lines (6a, 7);
the second DC-to-DC converter (24) comprises a fourth pair of switches (29a, 29b) respectively connected to the second and third power-supply lines (6b, 7) to connect/disconnect the second battery pack (2b) to/from the second and third power-supply lines (6b, 7),
the method further comprising the steps of:
a) controlling the closing of the first or the second pair of switches associated with the first or second battery pack (2a, 2b) having a lower charge, and controlling the closing of the third or the fourth pair of contactors associated with the first and the second DC-to-DC converters (22, 24), thus connecting the auxiliary power-supply source (26) to the first or second battery pack (2a, 2b) having a lower charge; and
b) controlling the closing of the first and the second pairs of switches associated with the first and the second battery packs (2a, 2b), and controlling the closing of the third and the fourth pairs of switches associated with the first and the second DC-to-DC converters (22, 24), thus recharging the first and the second battery packs (2a, 2b) with said recharge voltage.

14. The method according to claim 10, further comprising the step of operating the first or the second bidirectional DC-to-DC converter (22, 24) to transfer an electric current from one between the first and the second battery packs (2a, 2b) towards the auxiliary power-supply source (26).

15. The A power-supply and recharge method for an electric vehicle (50), the electric vehicle comprising:
a connector (4) connectable to a recharge station to receive a recharge voltage of the electric vehicle;
a power-supply bus (6), including a first (6a) and a second (6b) power-supply line, connected to the connector (4) by means of a first and a second switch (16a, 16b) respectively;
a third power-supply line (7);
a first battery pack (2a), having a nominal recharge voltage, electrically connected between the first power-supply line (6a) and the third power-supply line (7);

a second battery pack (2b), having said nominal recharge voltage, electrically connected between the second power-supply line (6b) and the third power-supply line (7);

a first bidirectional DC-to-DC converter (22) connected between the first power-supply line (6a) and the third power-supply line (7) by means of a first pair of connection terminals, and provided with a second pair of connection terminals;

a second bidirectional DC-to-DC converter (24) electrically connected between the second power-supply line (6b) and the third power-supply line (7) by means of a third pair of connection terminals, and provided with a fourth pair of connection terminals, wherein the second and the fourth pairs of connection terminals are electrically connected to one another, the power-supply and recharge method comprising the steps of:

detecting whether a charge difference between the first and the second battery packs (2a, 2b) is higher than a threshold;

opening the first and the second switches (16a, 16b) to electrically isolate the power-supply bus (6) from the connector (4);

operating the first and the second bidirectional DC-to-DC converters (22, 24) to transfer an electric current from the first or the second battery pack (2a, 2b) having a higher charge to the other between the first and the second battery packs (2a, 2b) having a lower charge, until said charge difference is within said threshold;

closing the first and the second switches (16a, 16b) to electrically connect the power-supply bus (6) to the connector (4); and coupling the first and second battery packs (2a, 2b) to the power-supply bus (6) and electrically in series to each other, to recharge the first and the second battery packs (2a, 2b) with said recharge voltage.

* * * * *